(12) United States Patent
Alderson et al.

(10) Patent No.: US 8,299,359 B2
(45) Date of Patent: Oct. 30, 2012

(54) WIRING DEVICE AND COVER PLATE SNAP-ON ASSEMBLY

(75) Inventors: David Alderson, Morganton, NC (US); Michael D. Williams, Morganton, NC (US); Clifford G. Martin, Newton, NC (US)

(73) Assignee: Leviton Manufacturing Company, Inc., Melville, NY (US)

( * ) Notice: Subject to any disclaimer, the term of this patent is extended or adjusted under 35 U.S.C. 154(b) by 0 days.

(21) Appl. No.: 13/101,839

(22) Filed: May 5, 2011

(65) Prior Publication Data

US 2011/0203828 A1     Aug. 25, 2011

Related U.S. Application Data

(63) Continuation of application No. 11/744,637, filed on May 4, 2007, now Pat. No. 7,960,651.

(60) Provisional application No. 60/807,686, filed on Jul. 18, 2006.

(51) Int. Cl.
*H02G 3/14* (2006.01)
*H05K 5/03* (2006.01)

(52) U.S. Cl. .............. 174/66; 174/67; 174/53; 220/241; 220/242; D13/177

(58) Field of Classification Search ........... 174/66, 174/67, 50, 53, 57, 58, 480, 481; 220/3.2–3.9, 220/241, 242; 439/535, 536; D13/177, 156
See application file for complete search history.

(56) References Cited

U.S. PATENT DOCUMENTS

| | | | |
|---|---|---|---|
| 867,624 A | 10/1907 | Warthen |
| 1,113,762 A | 10/1914 | Eckman |
| 1,726,429 A | 8/1929 | Ferris |
| 1,785,463 A | 12/1930 | Strongson |
| 1,840,582 A | 1/1932 | Hubbell |
| 1,933,358 A | 10/1933 | Almcrantz |
| 1,964,535 A | 6/1934 | Schreiber |
| 2,043,865 A | 9/1936 | Place |
| 2,149,719 A | 3/1939 | Arnest |
| 2,297,862 A | 10/1942 | Bachmann |
| 2,512,188 A | 6/1950 | Wait et al. |
| 2,515,820 A | 7/1950 | Clark |

(Continued)

FOREIGN PATENT DOCUMENTS

CA     1277409     12/1990

(Continued)

OTHER PUBLICATIONS

"Product Catalog for Cheetah U.S.A. Corporation 2006-2007", Sandy, Utah. 20 pages.

(Continued)

*Primary Examiner* — Angel R Estrada
(74) *Attorney, Agent, or Firm* — Collard & Roe, P.C.

(57) ABSTRACT

An installation of a wiring device configured to receive a cover plate which snaps on to a wiring device such as a switch or receptacle. With this invention, openings for threaded fasteners in the face of the cover plate are eliminated. In an embodiment, the cover plate has an opening sized to accommodate a wiring device and supports, on opposing side walls of the opening, at least one protrusion. The protrusions on the cover plate are located to detachably engage corresponding protrusions on the wiring device as the cover plate is pressed onto the wiring device.

14 Claims, 8 Drawing Sheets

U.S. PATENT DOCUMENTS

| | | | |
|---|---|---|---|
| 2,740,873 A | 4/1956 | Cronk | |
| 2,794,890 A | 6/1957 | Taylor | |
| 2,828,394 A | 3/1958 | Mayzik | |
| 2,860,317 A | 11/1958 | Johnson | |
| 2,920,303 A | 1/1960 | Johnson | |
| 2,934,590 A * | 4/1960 | Thompson et al. | 174/66 |
| 2,980,756 A | 4/1961 | Kelleher | |
| D196,838 S | 11/1963 | Cleminshaw | |
| 3,155,808 A | 11/1964 | Wiley | |
| 3,168,612 A | 2/1965 | Sorenson | |
| 3,437,737 A | 4/1969 | Wagner | |
| 3,488,428 A | 1/1970 | Smith | |
| 3,609,213 A | 9/1971 | Winter et al. | |
| 3,662,085 A | 5/1972 | Robinson et al. | |
| 3,689,868 A | 9/1972 | Snyder | |
| 3,735,020 A | 5/1973 | Licata | |
| 3,767,151 A | 10/1973 | Seal et al. | |
| 3,770,872 A | 11/1973 | Brown | |
| 3,770,920 A | 11/1973 | Poliak | |
| 3,814,834 A | 6/1974 | Glader | |
| 3,848,764 A | 11/1974 | Salg | |
| 3,859,454 A | 1/1975 | Mann | |
| 3,905,570 A | 9/1975 | Nieuwveld | |
| 3,908,235 A * | 9/1975 | Telliard et al. | 174/66 |
| 3,926,330 A | 12/1975 | Deming et al. | |
| 3,928,716 A | 12/1975 | Marrero | |
| 3,953,933 A | 5/1976 | Goldstein | |
| 3,955,463 A | 5/1976 | Hoehn | |
| 3,982,084 A | 9/1976 | Cooperstein | |
| 4,007,852 A | 2/1977 | Gernhardt | |
| 4,057,164 A | 11/1977 | Maier | |
| 4,062,470 A | 12/1977 | Boteler | |
| 4,098,423 A | 7/1978 | Marrero | |
| 4,105,862 A | 8/1978 | Hoehn | |
| RE29,752 E | 9/1978 | Jaconette, Jr. | |
| 4,165,443 A | 8/1979 | Figart et al. | |
| 4,263,472 A | 4/1981 | Maheu | |
| 4,273,957 A | 6/1981 | Kolling, Jr. | |
| 4,281,773 A | 8/1981 | Mengeu | |
| 4,295,003 A | 10/1981 | Borja et al. | |
| 4,304,958 A | 12/1981 | Neff et al. | |
| 4,306,109 A | 12/1981 | Nattel | |
| 4,311,422 A | 1/1982 | Jackovitz | |
| 4,315,100 A | 2/1982 | Haslbeck et al. | |
| 4,316,999 A | 2/1982 | Nattel | |
| 4,340,795 A | 7/1982 | Arthur | |
| 4,348,547 A | 9/1982 | Bowden, Jr. | |
| 4,355,198 A | 10/1982 | Gartland, Jr. | |
| D269,510 S | 6/1983 | Doyle et al. | |
| 4,389,535 A | 6/1983 | Slater et al. | |
| 4,399,922 A | 8/1983 | Horsley | |
| 4,408,696 A | 10/1983 | Crosson | |
| 4,436,952 A | 3/1984 | Lockwood | |
| 4,489,297 A | 12/1984 | Haydon et al. | |
| 4,500,746 A | 2/1985 | Meehan | |
| 4,534,486 A * | 8/1985 | Eidson | 174/66 |
| 4,580,689 A | 4/1986 | Slater | |
| 4,605,816 A | 8/1986 | Jorgensen et al. | |
| 4,631,354 A * | 12/1986 | Boteler | 174/66 |
| 4,645,089 A | 2/1987 | Horsley | |
| 4,669,797 A | 6/1987 | Bourdon | |
| 4,669,804 A | 6/1987 | Munroe | |
| 4,688,693 A | 8/1987 | Medlin, Jr. | |
| 4,724,282 A | 2/1988 | Troder | |
| 4,732,356 A | 3/1988 | Medlin, Sr. | |
| 4,733,330 A | 3/1988 | Tanaka et al. | |
| 4,793,059 A | 12/1988 | Moreau et al. | |
| 4,810,199 A | 3/1989 | Kar | |
| 4,832,297 A | 5/1989 | Carpenter | |
| 4,833,277 A | 5/1989 | Jacoby, Jr. et al. | |
| 4,835,343 A | 5/1989 | Graef et al. | |
| 4,837,406 A | 6/1989 | Emmons | |
| 4,843,189 A | 6/1989 | Jorgensen et al. | |
| 4,844,275 A | 7/1989 | Schnell et al. | |
| 4,898,357 A | 2/1990 | Jorgensen et al. | |
| 4,903,851 A | 2/1990 | Slough | |
| 4,909,692 A | 3/1990 | Hendren | |
| 4,927,373 A | 5/1990 | Dickie | |
| 4,936,396 A | 6/1990 | Lockwood | |
| 4,939,383 A | 7/1990 | Tucker et al. | |
| 4,948,317 A | 8/1990 | Marinaro | |
| 4,954,667 A | 9/1990 | Jorgensen et al. | |
| 4,960,964 A | 10/1990 | Schnell et al. | |
| 4,964,525 A | 10/1990 | Coffey et al. | |
| 4,974,888 A | 12/1990 | Childers | |
| 4,978,092 A | 12/1990 | Nattel | |
| 5,031,785 A | 7/1991 | Lemme | |
| 5,031,789 A | 7/1991 | Dauberger | |
| 5,041,698 A | 8/1991 | Takagi et al. | |
| 5,064,386 A | 11/1991 | Dale et al. | |
| 5,073,681 A * | 12/1991 | Hubben et al. | 174/66 |
| 5,084,596 A | 1/1992 | Borsh et al. | |
| 5,117,122 A | 5/1992 | Hogarth et al. | |
| D327,212 S | 6/1992 | Hubben et al. | |
| 5,135,411 A | 8/1992 | Wiley et al. | |
| 5,153,816 A | 10/1992 | Griffin | |
| 5,170,013 A | 12/1992 | Borsh et al. | |
| 5,170,014 A | 12/1992 | Borsh | |
| 5,176,345 A | 1/1993 | Medlin | |
| 5,180,886 A * | 1/1993 | Dierenbach et al. | 174/66 |
| 5,189,259 A * | 2/1993 | Carson et al. | 174/66 |
| 5,207,317 A | 5/1993 | Bryde et al. | |
| D336,744 S | 6/1993 | Kahn et al. | |
| 5,223,673 A | 6/1993 | Mason | |
| 5,224,673 A | 7/1993 | Webb | |
| 5,277,602 A | 1/1994 | Yi | |
| 5,289,934 A | 3/1994 | Smith et al. | |
| 5,306,178 A | 4/1994 | Huang | |
| D346,949 S | 5/1994 | Comerci et al. | |
| 5,317,108 A | 5/1994 | Prairie, Jr. | |
| RE34,786 E | 11/1994 | Slough | |
| 5,375,728 A | 12/1994 | West | |
| D354,943 S | 1/1995 | Williams et al. | |
| 5,407,088 A | 4/1995 | Jorgensen et al. | |
| 5,415,564 A | 5/1995 | Winter et al. | |
| D360,876 S | 8/1995 | Hughes | |
| 5,449,860 A * | 9/1995 | Buckshaw et al. | 174/67 |
| 5,456,373 A | 10/1995 | Ford | |
| D364,141 S | 11/1995 | Hanna et al. | |
| 5,477,010 A | 12/1995 | Buckshaw et al. | |
| 5,484,309 A | 1/1996 | Howard et al. | |
| 5,538,437 A | 7/1996 | Bates, III et al. | |
| 5,590,858 A | 1/1997 | Bourassa et al. | |
| 5,594,208 A | 1/1997 | Cancellieri et al. | |
| 5,595,362 A | 1/1997 | Rinderer et al. | |
| 5,596,174 A | 1/1997 | Sapienza | |
| 5,599,512 A | 2/1997 | Latulippe et al. | |
| 5,623,124 A | 4/1997 | Chien | |
| 5,675,125 A | 10/1997 | Hollinger | |
| 5,696,350 A | 12/1997 | Anker | |
| 5,706,559 A | 1/1998 | Oliver et al. | |
| 5,723,817 A | 3/1998 | Arenas et al. | |
| 5,741,102 A | 4/1998 | Everett et al. | |
| 5,744,750 A | 4/1998 | Almond | |
| 5,783,787 A | 7/1998 | Data | |
| D401,566 S | 11/1998 | Gesmondi et al. | |
| 5,833,110 A | 11/1998 | Chandler et al. | |
| 5,835,980 A | 11/1998 | Houssian | |
| 5,842,822 A | 12/1998 | Everett et al. | |
| 5,863,016 A | 1/1999 | Makwinski et al. | |
| D405,760 S | 2/1999 | Yu | |
| D405,761 S | 2/1999 | Yu | |
| 5,895,888 A * | 4/1999 | Arenas et al. | 174/66 |
| 5,900,584 A | 5/1999 | Cady et al. | |
| 5,950,812 A | 9/1999 | Tanacan et al. | |
| 5,961,345 A | 10/1999 | Finn et al. | |
| 5,965,845 A | 10/1999 | Reiker | |
| 5,965,846 A | 10/1999 | Shotey et al. | |
| 6,005,308 A | 12/1999 | Bryde et al. | |
| D419,531 S | 1/2000 | Keung et al. | |
| 6,023,021 A | 2/2000 | Matthews et al. | |
| 6,036,536 A | 3/2000 | Chiu | |
| 6,040,967 A | 3/2000 | DiSalvo | |
| 6,051,787 A | 4/2000 | Rintz | |
| 6,066,805 A | 5/2000 | Bordwell et al. | |
| 6,093,890 A | 7/2000 | Gretz | |
| 6,107,568 A | 8/2000 | Schnell et al. | |

| | | |
|---|---|---|
| 6,109,937 A | 8/2000 | Bonilla et al. |
| D430,539 S | 9/2000 | Leopold et al. |
| 6,147,304 A | 11/2000 | Doherty |
| 6,160,219 A | 12/2000 | Maltby et al. |
| 6,166,329 A | 12/2000 | Oliver et al. |
| 6,184,466 B1 | 2/2001 | Eder et al. |
| 6,191,361 B1 | 2/2001 | Matty |
| 6,207,898 B1 | 3/2001 | Reiker |
| 6,218,617 B1 | 4/2001 | Estanislao et al. |
| 6,229,087 B1 | 5/2001 | Archer |
| 6,257,925 B1 | 7/2001 | Jones |
| 6,341,981 B1 | 1/2002 | Gorman |
| 6,347,959 B2 | 2/2002 | Sawayanagi |
| 6,355,885 B1 | 3/2002 | Rintz et al. |
| 6,365,831 B1 | 4/2002 | Rupp et al. |
| 6,368,141 B1 | 4/2002 | VanAntwerp et al. |
| 6,376,770 B1 | 4/2002 | Hyde |
| 6,384,334 B1 | 5/2002 | Webb |
| 6,410,850 B1 | 6/2002 | Abel et al. |
| 6,423,897 B1 | 7/2002 | Roesch et al. |
| 6,441,304 B1 | 8/2002 | Currier et al. |
| 6,452,813 B1 | 9/2002 | Gretz |
| 6,501,022 B2 * | 12/2002 | Victor ............... 174/66 |
| 6,522,269 B2 | 2/2003 | Abbiale et al. |
| 6,533,225 B1 | 3/2003 | Berges et al. |
| 6,552,269 B1 | 4/2003 | Conner |
| 6,609,927 B2 | 8/2003 | Kidman |
| 6,616,005 B1 | 9/2003 | Pereira et al. |
| 6,624,355 B1 | 9/2003 | Gretz |
| D484,392 S | 12/2003 | Mayo et al. |
| 6,679,725 B2 * | 1/2004 | Kidman ............ 174/66 |
| 6,765,149 B1 | 7/2004 | Ku |
| 6,814,611 B1 | 11/2004 | Torres |
| 6,840,800 B2 | 1/2005 | Kidman |
| 6,875,940 B2 | 4/2005 | Endres et al. |
| 6,884,111 B2 | 4/2005 | Gorman |
| 6,891,117 B1 | 5/2005 | Gouhl et al. |
| 6,923,663 B2 * | 8/2005 | Oddsen et al. ........ 439/535 |
| 6,943,297 B2 | 9/2005 | Capella |
| 6,949,708 B1 | 9/2005 | Hausen et al. |
| D512,377 S | 12/2005 | Fort et al. |
| 6,974,910 B2 | 12/2005 | Rohmer |
| D517,729 S | 3/2006 | Angeletta |
| 7,030,319 B2 | 4/2006 | Johnsen et al. |
| 7,048,575 B2 | 5/2006 | Kidman |
| 7,049,511 B2 | 5/2006 | Gledhill et al. |
| 7,052,314 B1 | 5/2006 | Rose |
| 7,071,414 B2 * | 7/2006 | Kim ............... 174/66 |
| 7,075,009 B1 | 7/2006 | Rohmer |
| 7,077,695 B2 | 7/2006 | Kidman |
| 7,077,706 B1 * | 7/2006 | Yang .............. 174/66 |
| 7,083,467 B2 | 8/2006 | Kidman |
| 7,102,081 B2 * | 9/2006 | Xu et al. ........... 174/66 |
| 7,118,413 B2 | 10/2006 | Kidman |
| 7,122,740 B2 | 10/2006 | Xu et al. |
| 7,122,753 B1 | 10/2006 | Davis |
| 7,122,754 B2 | 10/2006 | Endres et al. |
| 7,126,070 B2 | 10/2006 | Endres et al. |
| D534,875 S | 1/2007 | Wu |
| 7,211,727 B2 * | 5/2007 | Pearse et al. ......... 174/53 |
| 7,279,636 B2 | 10/2007 | Oddsen et al. |
| 7,284,996 B2 | 10/2007 | Kidman |
| 7,306,482 B1 | 12/2007 | Kidman |
| D558,676 S | 1/2008 | Fort et al. |
| 7,318,732 B2 | 1/2008 | Kidman |
| D563,909 S | 3/2008 | Kidman |
| 7,342,173 B1 | 3/2008 | Kidman |
| D571,729 S | 6/2008 | Kidman |
| D571,730 S | 6/2008 | Kidman |
| D573,006 S | 7/2008 | Kidman |
| 7,395,598 B2 | 7/2008 | Kidman |
| 7,396,997 B2 | 7/2008 | Dinh |
| D576,866 S | 9/2008 | Kidman |
| D576,961 S | 9/2008 | Kidman |
| D576,962 S | 9/2008 | Kidman |
| 7,425,681 B2 | 9/2008 | Xu et al. |
| D577,985 S | 10/2008 | Kidman |
| 7,431,594 B2 | 10/2008 | Castaldo et al. |
| 7,435,903 B2 * | 10/2008 | Tufano et al. ........ 174/66 |
| D580,740 S | 11/2008 | Kidman |
| 7,463,124 B2 | 12/2008 | DiSalvo et al. |
| 7,494,371 B2 | 2/2009 | Kidman |
| 7,538,285 B2 | 5/2009 | Patel et al. |
| D596,925 S | 7/2009 | Kidman |
| 7,611,364 B2 | 11/2009 | Kidman |
| 7,667,616 B2 | 2/2010 | Fair et al. |
| 7,756,556 B2 | 7/2010 | Patel et al. |
| 7,915,528 B2 | 3/2011 | Ni |
| 7,960,651 B2 | 6/2011 | Alderson et al. |
| 8,029,301 B2 | 10/2011 | Kidman |
| 8,109,785 B2 | 2/2012 | Kidman |
| 2002/0020542 A1 | 2/2002 | Reiker |
| 2003/0014939 A1 | 1/2003 | DeWall |
| 2003/0079898 A1 | 5/2003 | Kidman |
| 2003/0109173 A1 | 6/2003 | Kidman |
| 2003/0226681 A1 | 12/2003 | Lindenstraus et al. |
| 2003/0226682 A1 | 12/2003 | Tufano et al. |
| 2003/0226683 A1 | 12/2003 | Tufano et al. |
| 2004/0242061 A1 | 12/2004 | Gledhill et al. |
| 2005/0257951 A1 | 11/2005 | Xu et al. |
| 2006/0048964 A1 | 3/2006 | Rick |
| 2006/0086525 A1 | 4/2006 | Xu et al. |
| 2006/0258207 A1 | 11/2006 | Kidman |
| 2007/0193863 A1 | 8/2007 | Wu |
| 2011/0261511 A1 | 10/2011 | Alderson et al. |

FOREIGN PATENT DOCUMENTS

| | | |
|---|---|---|
| MX | 28466 | 12/2008 |
| MX | 29052 | 12/2008 |
| WO | 02/071426 | 9/2002 |
| WO | 2006/091275 | 8/2006 |
| WO | 2010/070376 | 6/2010 |

OTHER PUBLICATIONS

International Search Report and Written Opinion of the International Searching Authority for PCT/US2007/73702; filed on Jul. 16, 2007, which was mailed on Feb. 19, 2008. 4 pages.

Entratech Systems, "Infoplate recessed wall outlet system, designed for appealing aesthetics and versatile function," http://www.entratechsystems.com/infoplace.html, Apr. 11, 2003, pp. 1-4.

Entratech Systems, "Instructions and Specifications," Infoplate plus, Sandusky, Ohio; 2001, pp. 1-2.

Hubbell, "Self Contained Wiring Devices," Wirecon Installation Guide, location unknown, 2000, pp. 1-20.

Leviton, "Decora Plus Snap-On Wallplates," http://www.leviton.com/sections/prodinfo/decora/sheets/s5c7p9.htm, Jun. 7, 2001, pp. 1-2.

Pass and Seymour Legrand, "Self Contained Devices," 2005, pp. 1-6.

International Search Report mailed Aug. 28, 2002 in PCT/US2002/007472, 3 pages.

International Search Report mailed Dec. 6, 2006 in PCT/US2006/000879, 5 pages.

Final Office Action mailed Apr. 27, 2009 in U.S. Appl. No. 12/014,061, 8 pages.

Final Office Action mailed Jan. 12, 2009 in U.S. Appl. No. 12/014,061, 10 pages.

Non-Final Office Action mailed Feb. 22, 2007 in U.S. Appl. No. 11/605,721, 5 pages.

Non-Final Office Action mailed Aug. 1, 2007 in U.S. Appl. No. 11/605,721, 6 pages.

Non-Final Office Action mailed Jul. 12, 2006 in U.S. Appl. No. 11/328,650, 10 pages.

Non-Final Office Action mailed Jun. 6, 2008 in U.S. Appl. No. 12/014,061, 6 pages.

Non-Final Office Action mailed Nov. 21, 2006 in U.S. Appl. No. 11/328,650, 6 pages.

Notice of Allowance mailed Apr. 23, 2007 in U.S. Appl. No. 11/328,650, 6 pages.

Notice of Allowance mailed Jul. 2, 2009 in U.S. Appl. No. 12/014,061, 6 pages.

Notice of Allowance mailed Nov. 5, 2007 in U.S. Appl. No. 11/605,721, 6 pages.

Supplemental Notice of Allowance mailed Aug. 21, 2007 in U.S. Appl. No. 11/328,650, 2 pages.
Final Office Action mailed Apr. 16, 2008 in U.S. Appl. No. 11/542,746, 5 pages.
Final Office Action mailed Jan. 12, 2010 in U.S. Appl. No. 11/286,033, 6 pages.
Final Office Action mailed Jan. 7, 2009 in U.S. Appl. No. 11/286,033, 8 pages.
Final Office Action mailed Mar. 9, 2005 in U.S. Appl. No. 10/435,716, 8 pages.
Final Office Action mailed Oct. 31, 2007 in U.S. Appl. No. 11/286,033, 6 pages.
Non-Final Office Action mailed Aug. 10, 2007 in U.S. Appl. No. 11/542,746, 4 pages.
Non-Final Office Action mailed Dec. 28, 2007 in U.S. Appl. No. 11/542,746, 5 pages.
Non-Final Office Action mailed Feb. 20, 2007 in U.S. Appl. No. 11/542,746, 6 pages.
Non-Final Office Action mailed Jul. 26, 2005 in U.S. Appl. No. 10/793,186, 7 pages.
Non-Final Office Action mailed Jul. 27, 2007 in U.S. Appl. No. 11/286,033, 5 pages.
Non-Final Office Action mailed Jul. 7, 2003 in U.S. Appl. No. 10/342,701, 8 pages.
Non-Final Office Action mailed Jun. 8, 2009 in U.S. Appl. No. 11/286,033, 8 pages.
Non-Final Office Action mailed Mar. 11, 2004 in U.S. Appl. No. 10/435,716, 7 pages.
Non-Final Office Action mailed Mar. 17, 2008 in U.S. Appl. No. 11/286,033, 6 pages.
Non-Final Office Action mailed Mar. 8, 2007 in U.S. Appl. No. 11/496,266, 6 pages.
Non-Final Office Action mailed Oct. 3, 2005 in U.S. Appl. No. 11/031,452, 7 pages.
Non-Final Office Action mailed Sep. 12, 2007 in U.S. Appl. No. 11/286,090, 5 pages.
Non-Final Office Action mailed Sep. 23, 2004 in U.S. Appl. No. 10/435,716, 8 pages.
Notice of Allowance mailed Apr. 20, 2006 in U.S. Appl. No. 11/031,452, 6 pages.
Notice of Allowance mailed Aug. 3, 2006 in U.S. Appl. No. 10/435,716, 7 pages.
Notice of Allowance mailed Mar. 5, 2008 in U.S. Appl. No. 11/286,090, 4 pages.
Notice of Allowance mailed May 16, 2006 in U.S. Appl. No. 10/793,186, 6 pages.
Notice of Allowance mailed May 9, 2005 in U.S. Appl. No. 10/342,701, 2 pages.
Notice of Allowance mailed Nov. 25, 2003 in U.S. Appl. No. 10/342,701, 8 pages.
Notice of Allowance mailed Oct. 22, 2008 in U.S. Appl. No. 11/542,746, 6 pages.
Notice of Allowance mailed Sep. 7, 2007 in U.S. Appl. No. 11/496,266, 5 pages.
Non-Final Office Action mailed Jan. 19, 2011 in U.S. Appl. No. 11/286,033, 7 pages.
Final Office Action mailed Jul. 25, 2011 in U.S. Appl. No. 11/286,033, 8 pages.
File History for U.S. Appl. No. 12/014,061, filed Jan. 14, 2008, 158 pages.
File History for U.S. Application No. 12/391,139, filed Feb. 23, 2009, 59 pages.

* cited by examiner

WIRING DEVICE AND COVER PLATE SNAP-ON ASSEMBLY

CROSS REFERENCE TO RELATED APPLICATIONS

This application is a continuation application of U.S. application Ser. No. 11/744,637 filed on May 4, 2007, now U.S. Pat. No. 7,960,651 wherein that application claims priority pursuant to 35 U.S.C. 119(e) from U.S. Provisional Application having Application No. 60/807,686 filed Jul. 18, 2006, wherein the disclosures of both of these applications are hereby incorporated herein by reference in their entirety.

BACKGROUND OF THE INVENTION

1. Field of the Invention

This invention relates generally to an assembly of flush mounted wiring devices and more particularly to a wiring devices configured to receive a cover plate.

2. Description of the Prior Art

Prior art cover plates are usually in the form of a substantially flat plate having one or more openings which provide access to a wiring device within a wall box. The purpose of the cover plate is to provide a protective cover for the electrical box installation while preventing exposure of a user to the electrical wires in the interior of the electrical box. The term wiring device refers to, but is not limited to on-off switches, receptacles, outlets, dimmers motor speed control switches and the like. Wiring devices include a metal ground/mounting strap having two openings at each end, one being an oversize mounting opening for mounting the wiring device to an electrical box and the other a threaded opening for fastening the cover plate to the ground/mounting strap with screw fasteners. The oversize mounting openings permit the wiring device to be horizontally positioned while being mounted to a wall box.

The use of screws to attach a plate to a wiring device requires the installer to first align the openings in the cover plate with the threaded openings in the ground/mounting strap, then insert small screws through the cover plate and tighten the screws with a screw driver. The heads of the screws used to attach the cover plate to the wiring device are exposed and, therefore, may detract from the overall appearance of the cover plate. Currently, cover plates which are composed of plastic material are in widespread use. Thus, the use of screws to attach a plastic wall plate to the ground/mounting strap of a wiring device may cause the cover plate to fracture if the screws be over tightened.

What is needed is a wiring device having a frame, or housing which can be quickly and easily coupled to a cover plate by an installer without the use of screws.

SUMMARY OF THE INVENTION

The present invention relates to an assembly of wiring devices configured to receive a cover plate which snaps on to the frame of a wiring device such as a switch or receptacle. With this invention, openings for threaded fasteners in the face of the cover plate are eliminated. In an embodiment, the cover plate has an opening sized to accommodate a wiring device and supports, on opposing side walls of the opening, at least one protrusion. The protrusions on the cover plate are located to detachably engage corresponding protrusions on the wiring device as the cover plate is pressed onto the wiring device.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, feature and advantages of the present invention will become more fully apparent from the following detailed description, the appended claim and the accompanying drawings in which similar elements are given similar reference numerals where:

DETAILED DESCRIPTION OF THE INVENTION

Figure 1:
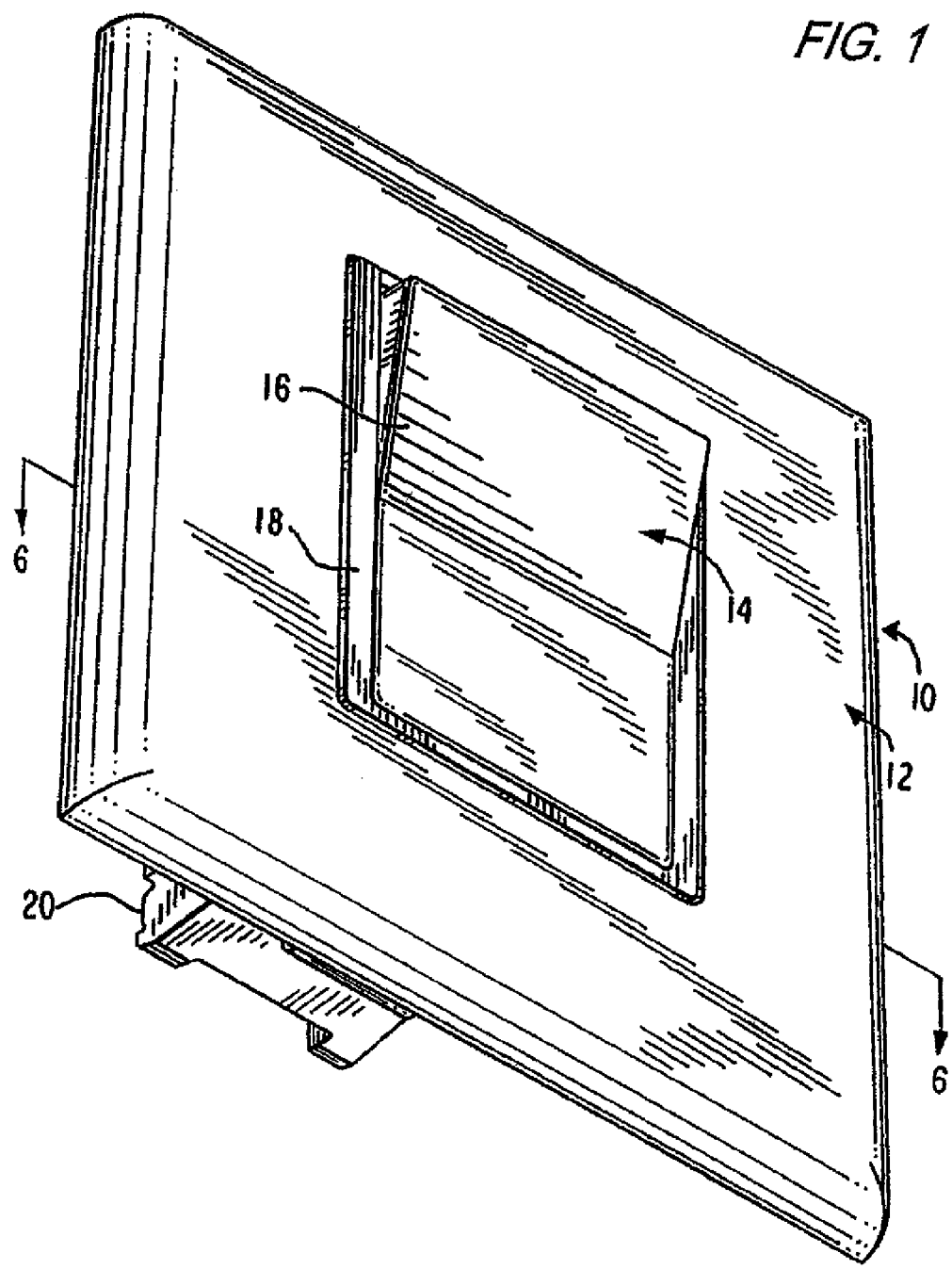
FIG. 1 is a perspective view of an on-off switch coupled to a cover plate in accordance with the principles of the invention.
Figure 2:
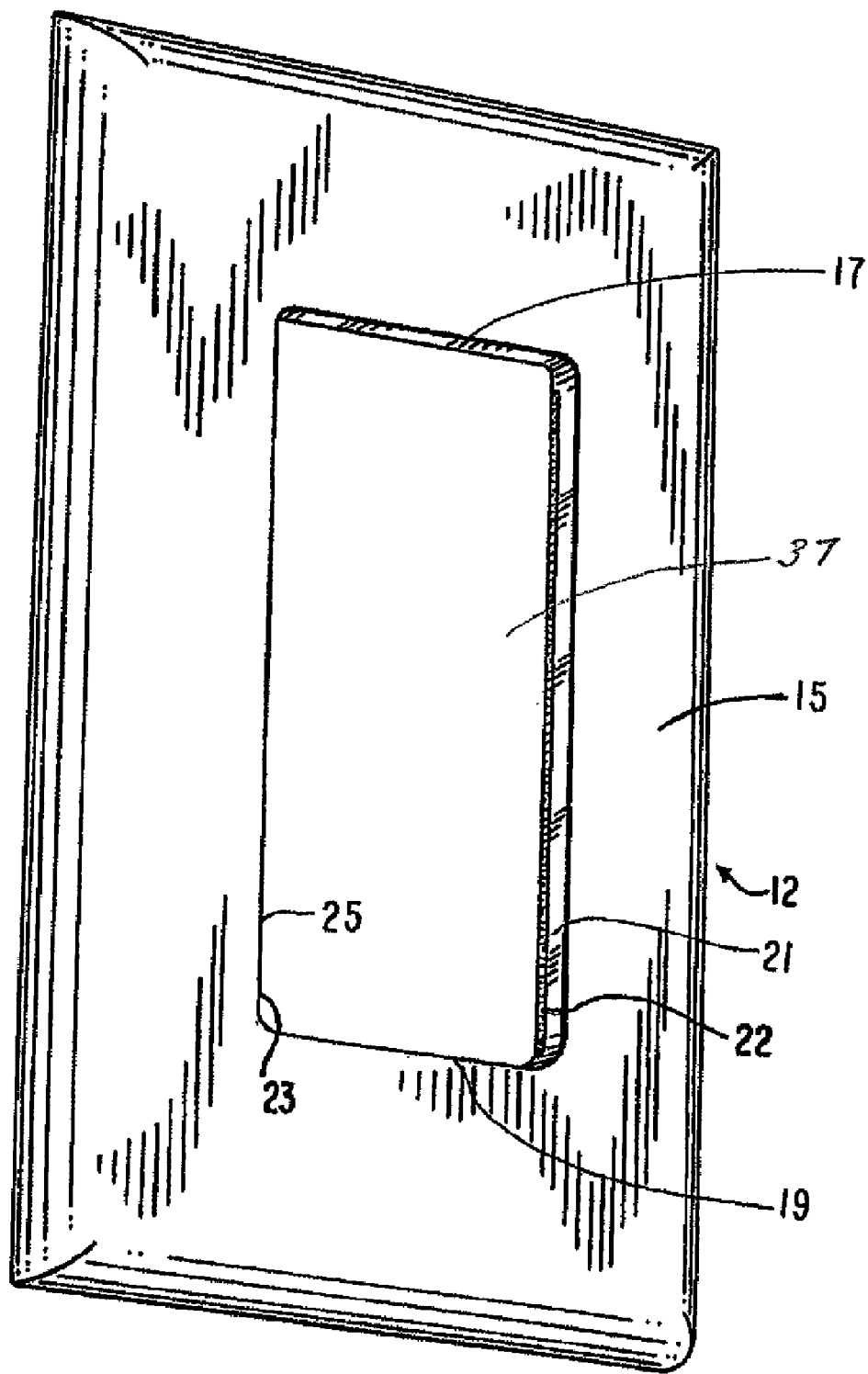
FIG. 2 is a perspective view of the cover plate of FIG. 1.
Figure 3:
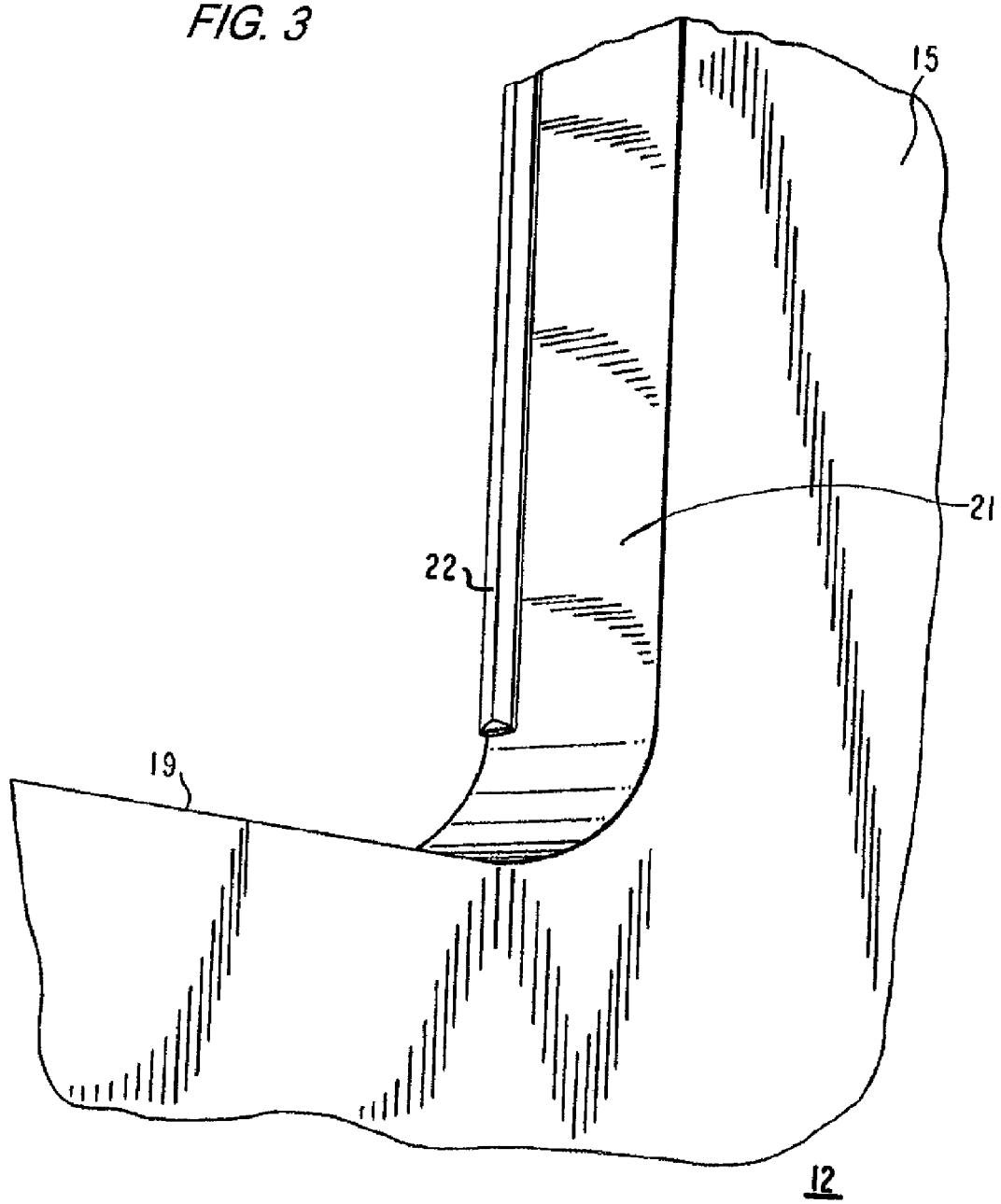
FIG. 3 is a detailed view of an inside corner of the opening in the cover plate of FIG. 2 showing a protrusion for engaging a protrusion on a wiring device.

FIG. 1 shows an electrical wiring device and cover plate assemblage 10 in accordance with an embodiment of the invention. As described below, cover plate 12 is securely coupled to the wiring device 14 without requiring either threaded fasteners or openings in the face of the cover plate. Referring to FIGS. 2 and 3, cover plate 12 has a rectangular aperture 37 defined by vertical wall 21, 25 and horizontal walls 17, 19. Vertical wall 21 supports a first shaped protrusion 22 and vertical wall 25 supports a second shaped protrusion (not shown). A wiring device, which can be an on-off switch 14 (see FIGS. 4 and 5) having a rocker paddle 16 located within a frame 18 for example, supports protrusions 24, 26, 28 disposed on upper and lower ends on the left side wall 32 of the frame 18 of the wiring device and similar structure on the right side wall 36 of the frame 18. The protrusion 22 (see FIGS. 6, 6A and 7) on the right side wall 21 of the aperture in cover plate 12 is positioned to mate with frame protrusions 24, 26, 28 on the right side wall 36 of the frame 18 of the on-off switch 14 and, in a similar manner, the cover plate protrusion 23 on the left side wall 25 of the aperture in cover plate 12 is positioned to mate with the frame protrusions 24, 26, 28 on the left side wall 32 of the frame 18 of the on-off switch.

Referring to FIG. 1, in a typical application, the on-off switch 14 electrically couples a power source to a load to control the power to the load. The switch 14 includes a frame 18, a switch paddle actuator 16 and a switch housing 20. The housing 20, which includes a ground/mounting strap, supports wiring contact assemblies (e.g., screws) for connection to power conductors (e.g., phase, neutral and ground) of an electrical wiring system such as a standard alternating current (AC) 120 Volts, 60 Hz power source, typically found in residential homes and commercial buildings. Although a rocker type of switch paddle actuator 16 is shown, another type of actuator such as a slider, rotatable knob etc. can be used. In addition, while the electrical wiring device 14 is shown as a switch, the invention here disclosed can be equally applied to a receptacle, a dimmer or other type of wiring device.

Figure 4:
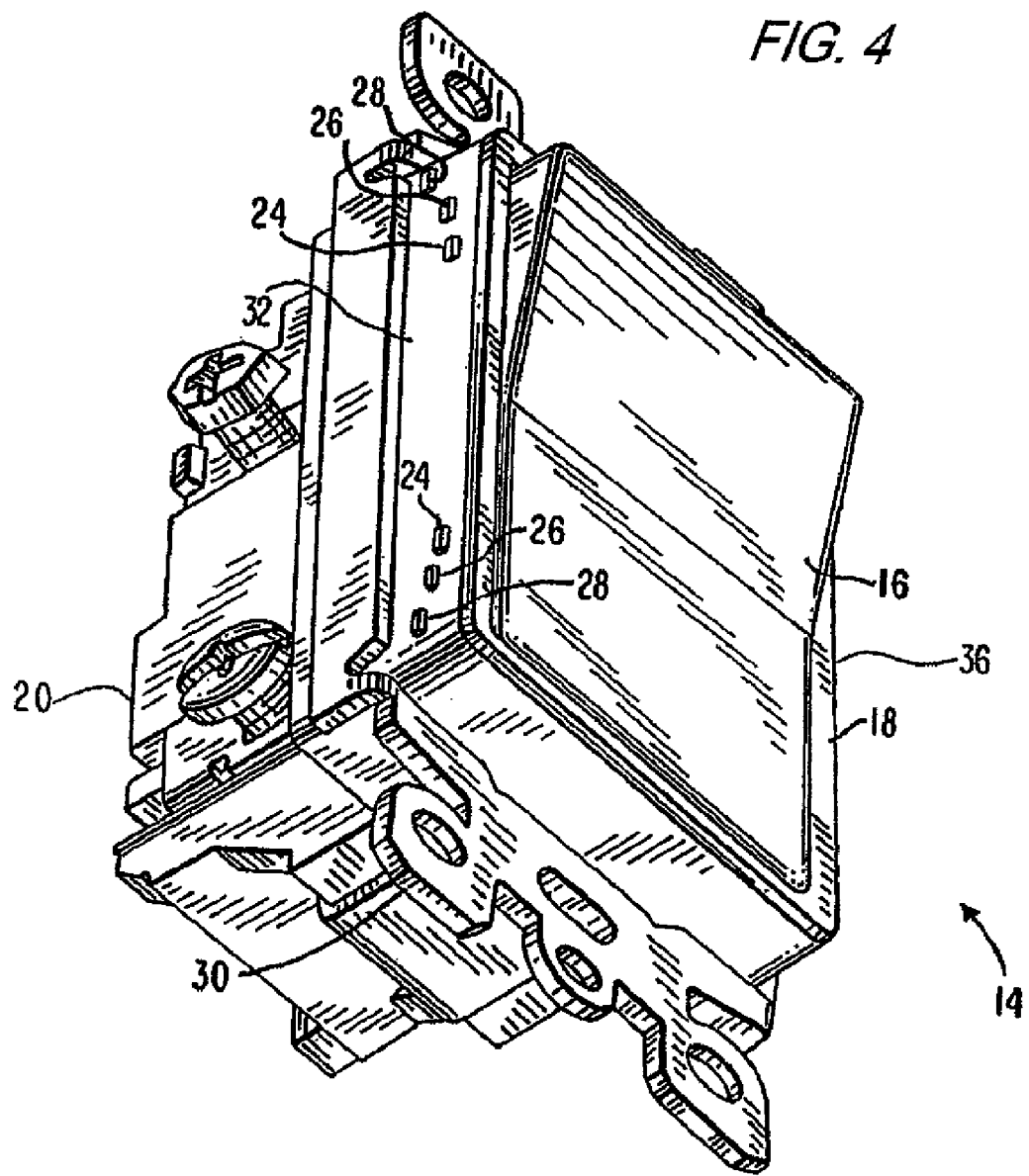
FIG. 4 is a perspective view of a wiring device showing a series of protrusions for engaging the protrusion on the cover plate.
Figure 5:
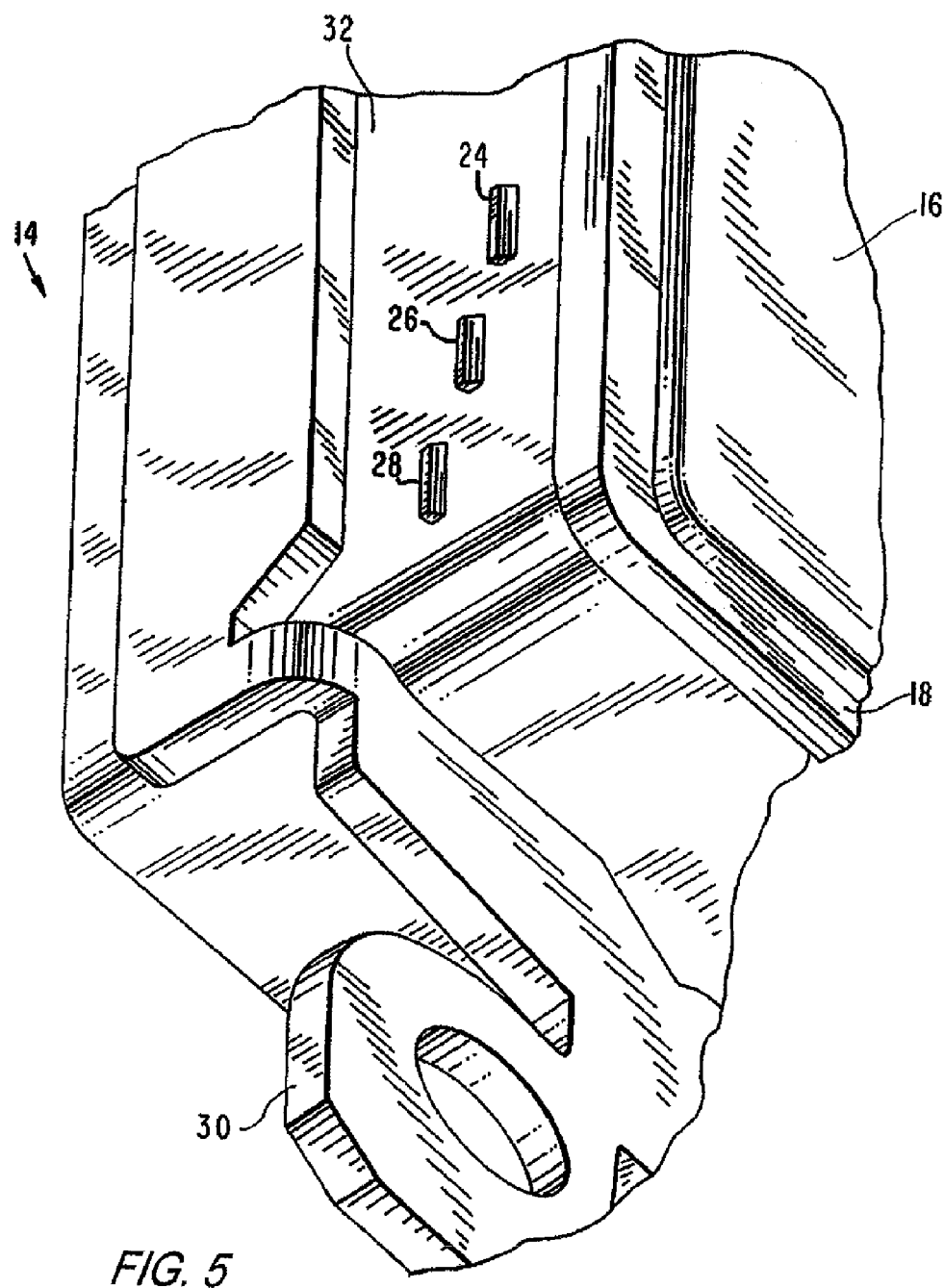
FIG. 5 is a detailed view of a corner portion of FIG. 4 showing the protrusions on the wiring device.

FIG. 3 shows a more detailed view of the protrusion on the vertical wall of the aperture of the cover plate 12, and FIG. 5 shows a more detailed view of the protrusions 24, 26 and 28 on the left side wall of the frame 18 of the switch 14. Referring to FIGS. 2 and 3, the cover plate 12 of the present embodiment has a front face surface 15 with a generally rectangular shaped central aperture 37 having vertical and horizontal walls. The aperture is sized to be positioned around the frame 18 (FIGS. 4 and 5) of the switch 14. The aperture in the cover plate 12 has a top wall 17, a bottom wall 19, a left side wall 21 and a right side wall 25. These walls are generally perpendicular to the front surface 15 of the cover plate and extend back from the front face surface of the cover plate. A cover plate protrusion 22 is disposed on the left side wall 21 along the vertical (longitudinal) axis of the cover plate 12 and a second protrusion 23 (not shown) is disposed in a similar manner on the right side wall 25 of the cover plate. Each protrusion 22 and 23 can be a strip of plastic having a cross section which is substantially triangular, half circular, triangular, equilateral triangular, or another suitable cross section.

Referring to FIGS. 4 and 5, the switch assembly 14 includes a ground/mounting strap 30 located between the housing 20 and the switch frame 18. The frame 18 of the present embodiment has a generally rectangular shape defined by a top wall, a bottom wall and two side walls. Each side wall supports two sets of frame protrusions 24, 26, 28, one set being located on the upper end of the side wall and the second set being located on the lower end of the side wall 36. Each frame protrusion 24, 26, 28 can have a horizontal wall 27, an angled ramp shaped wall 29 and a vertical wall 31. Each protrusion can have a cross section which is trapezium, semicircular, trapezoid, or another suitable cross section. The sets of frame protrusions are arranged along the side walls 32, 36 of the frame 18 to engage respective wall plate protrusions 22, 23 (FIGS. 2 and 3) on the cover plate. The frame protrusion 24, 26, 28 are shown arranged in a stair or offset step like fashion, but can be arranged in another configuration such as in an aligned arrangement. The triangular shaped cover plate protrusions 22, 23 (FIGS. 2 and 3), which are shown being disposed on the side walls 21, 25 can be repositioned to be disposed on the top and bottom walls 17, 19 of the cover plate and the sets of frame protrusions can be located on the top and bottom wall of the wiring device. The protrusion 22 on the cover plate 12 (FIGS. 2 and 3) is shown as a single linear triangular shaped members located to engage frame protrusions 24, 26, 28 on right side wall 36. However, it is understood that protrusion 22 can be two or more separate segments as long as they are located to engage the frame protrusions 24, 26, 28. The cover plate 12, the housing 20 and the switch frame 18 are normally made of non-conductive material such as plastic or other material, and the ground/mounting strap 30 is made of conductive material such as cold rolled steel, aluminum or other material.

Figure 6:
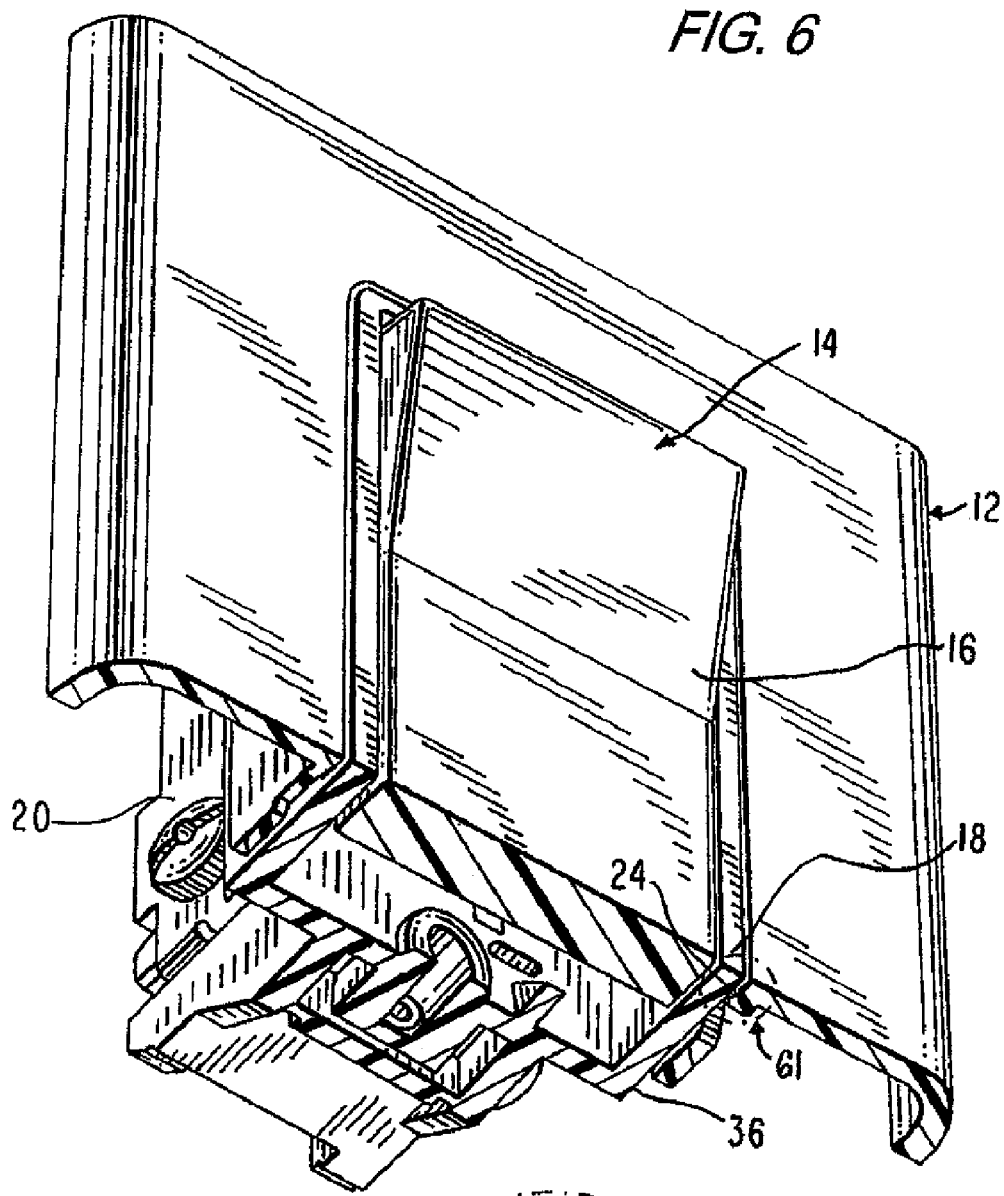
FIG. 6 is a perspective partial cut-away sectional view along line 6-6 of FIG. 1 showing the cover plate coupled to the wiring device.
Figure 6A:
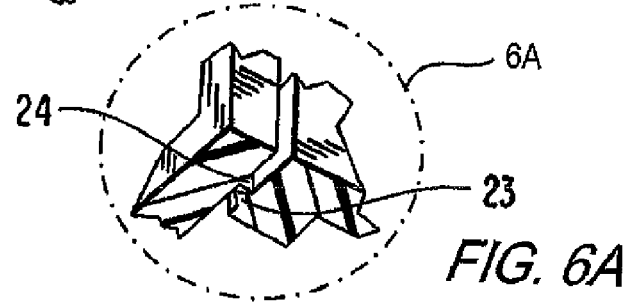
FIG. 6A is an exploded perspective view of circled section 61 of FIG. 6.
Figure 7:
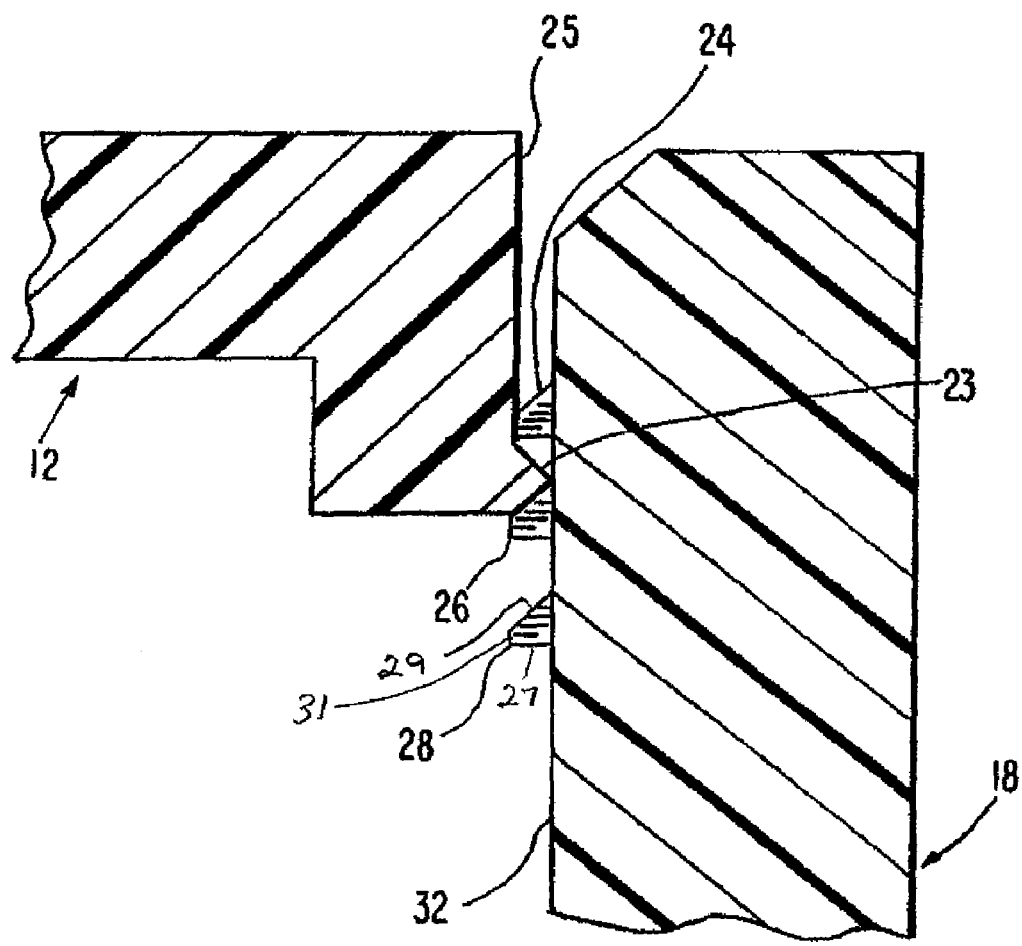
FIG. 7 is a detailed view showing the protrusion on the cover plate engaging the protrusion on the wiring device.

FIGS. 6 and 7 show detailed views of the cover plate 12 coupled to the switch frame assembly 14. A description of the coupling of the left side of the cover plate to the frame protrusions 24, 26, 28 on the left side wall 32 of the switch is provided. The coupling between the right side of the cover plate to the frame protrusion 24, 26, 28 on right side wall 36 of the switch is similar and, therefore, is not described. The side walls 21, 25 of the cover plate 12 are slightly flexible whereas the side walls 32, 36 of the frame 18 are rigid. Therefore, as the cover plate is pushed onto the switch, the protrusions 22, 23 on the cover plate 12 first make contact with the angled ramp shaped wall 29 of the first protrusion 24 of each set of protrusions on the frame 18. As the cover plate is pushed further, protrusions 22, 23 on the respective side walls 21, 25 of the cover plate yield slightly to pass over protrusions 24 and then spring back to their original position. The cover plate protrusions 22, 23 are shown having an angled ramp shaped wall on the front and a horizontal wall on the back, but another shape can be employed. The cover plate protrusions 22, 23 may be of the same material as the cover plate and can be formed with the cover plate or can be attached to the cover plate. The protrusions 24, 26, 28 on side walls 32, 36 of the switch are shown having a ramp shape wall on the front surface and a vertical wall on the back surface, but other shapes can be employed. Similar to the cover plate protrusions 22, 23, the switch protrusions 24, 26, 28 can be an integral part of the switch by molding the protrusion to the switch frame during the molding step. However, in some instances it may be desirable that the cover plate protrusions 22, 23 and the frame protrusions 24, 26, 28 are made from a more flexible material such as a yieldable plastic or rubber or the like so that they flex as they contact each other.

Referring to FIG. 7, a description is now provided of the coupling mechanism between the cover plate 12 and the switch assembly 14. In the description which follows, it is assumed that the switch assembly 14, and therefore the switch frame 18 is securely mounted to an electrical junction box and that a user wishes to attach or mount the cover plate 12 to the switch assembly. The opening 37 of the cover plate 12 is placed over the switch assembly 14 so that rear surface of the cover plate faces the front face of the switch assembly and the opening in the cover plate is aligned with the front face of the switch assembly. The cover plate 12 is then advanced towards the switch assembly 14 so that the rear surface of the cover plate protrusion 23 is brought into contact with the angled ramp shaped wall of the first frame protrusion 24. As noted above, the side wall of the cover plate 12, or the protrusion itself is slightly flexible and the side wall of the frame 18 is comparatively rigid. Therefore, in one embodiment, as the cover plate 12 is urged further towards the frame, the side wall of the cover plate or the protrusion on the cover plate yields by flexing and/or bending slightly to allow the cover plate protrusion 23 to pass over the first frame protrusion 24. Once the cover plate protrusion 23 passes over the first frame protrusion 24, the cover plate protrusion 23 ends up behind protrusion 24 and in front of the angled ramp shaped wall of the second frame protrusion 26.

At this time the cover plate is securely coupled to the switch frame assembly without the need for openings in the cover plate and threaded fasteners such as screws. Depending upon the position of the wall surface relative to the face of the switch, the cover plate 12, it may be possible to urged the cover plate further towards the frame to cause the cover plate protrusion 23 to pass over the second frame protrusion 26 and rest between the second frame protrusion 26 and the third frame protrusion 28. In either instance, the front surface of the cover plate will be parallel with the front surface of the switch frame. Although not shown, if desired the cover plate can be mounted to the frame at an angle (i.e., not parallel) by urging one end portion of the cover plate towards the frame while holding the opposite end of the cover plate fixed. This feature is can be used when the wall upon which the switch assembly 14 is installed is not parallel with the front surface of the frame.

To further illustrate the present invention, it will now be assumed that a user wants to remove the cover plate 12 from the switch assembly 14 and that the cover plate protrusions are located between the first and second frame protrusions 24, 26. To remove the cover plate, the user first grasps the cover plate 12, usually at the bottom or the top, and urges the end away from the assembly. This will cause the front surface of the cover plate protrusion 23 to move away from the second protrusion 26 and towards the rear surface of the first frame protrusion 24. As noted above, the side wall of the frame 18 is comparatively rigid and the side wall of the cover plate 12 and/or the cover plate protrusion can flex. As the cover plate 12 is pulled away from the wall, the side wall of the cover plate flexes slightly allowing the cover plate protrusion 23 to pass over the first frame protrusion 24. As the cover plate protrusion 23 passes over the first frame protrusion 24 the cover plate becomes detached from the switch assembly 14.

Figure 8:
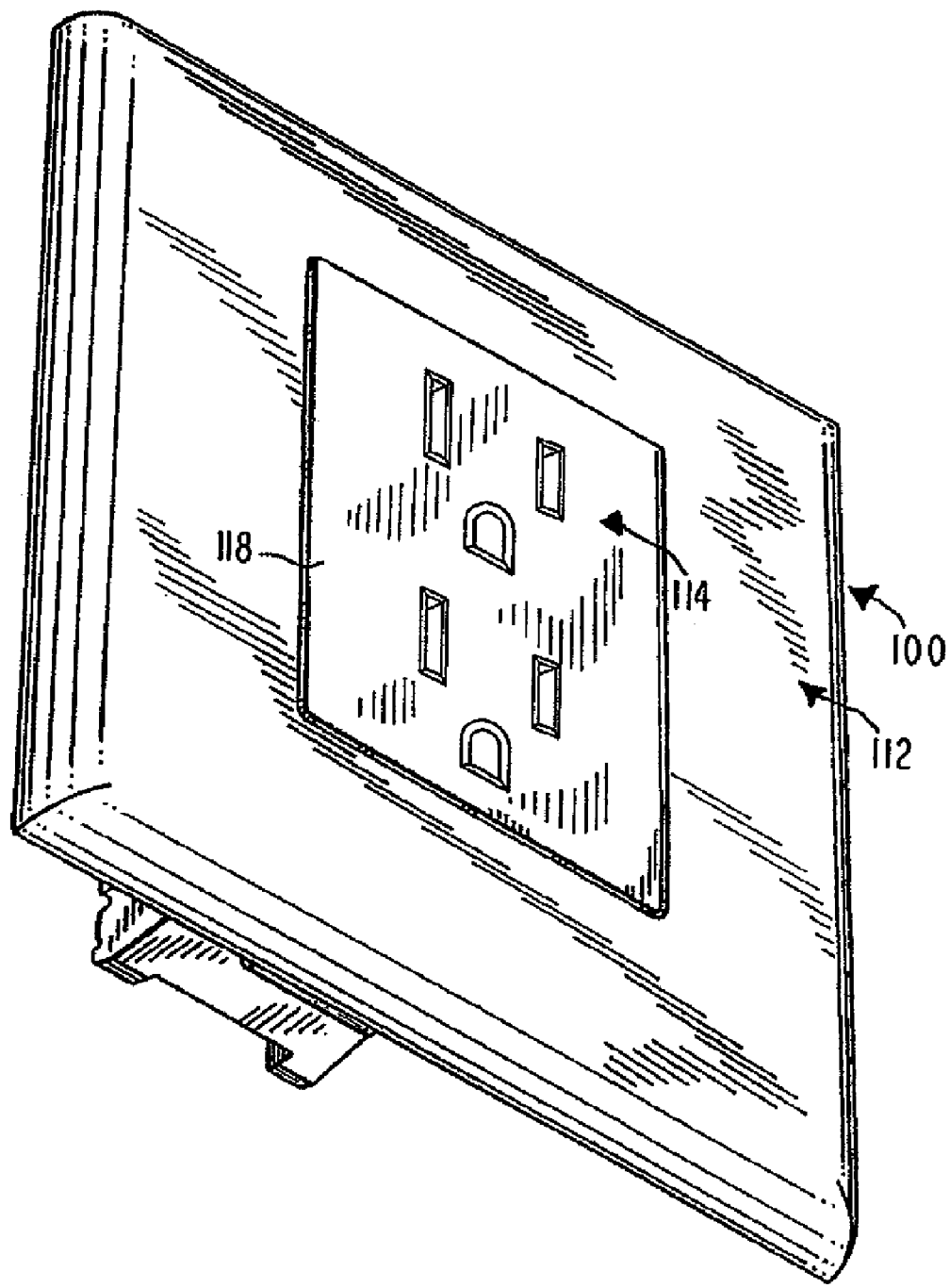
FIG. 8 is a front perspective view of a receptacle coupled to a cover plate in accordance with the principles of the invention.

FIG. 8 shows a cover plate and receptacle assembly 100 in accordance with an embodiment of the invention. The assembly 100 is similar to the assembly 10 of FIG. 1 except that the wiring device is a receptacle. The receptacle 114 shown as a duplex receptacle having openings for accepting the blades (phase and neutral) and ground pins of two plugs. The assembly 100 is a receptacle frame and cover plate snap-on assembly which does not have openings in the front face of cover plate or fasteners such as screws to hold the cover plate to the receptacle. The assembly 100 incorporates the techniques of the present invention as described above and, therefore, is not repeated here.

Although a rocker switch and a receptacle are shown in the figures, this invention would apply equally well to any wiring device and cover plate assembly including but not limited to a toggle switch, a standard duplex receptacle, a dimmer, a timer, etc. In addition, while a rocker switch is described in detail with a frame around the rocker, such a separate frame is not needed and the edge of any wiring device can be used and a frame is not required as a distinct element.

While there have been shown and described and pointed out the fundamental novel features of the invention as applied to the preferred embodiment, it will be understood that various omissions and substitutions and changes of the form and details of the apparatus illustrated and in its operation may be made by those skilled in the art, without departing from the spirit of the invention.

What is claimed is:

1. A wiring device comprising:
   a housing having a top surface, a top wall, a bottom wall and two side walls, the top surface being accessible to a user, and
   a first protrusion located on an outside surface of one of the walls and formed integral with the housing and adapted to be detachably engaged by a cover plate, and a second protrusion located on an outside surface of said wall, adjacent to said first protrusion but at a different depth relative to said first protrusion.

2. The wiring device of claim 1, further comprising: a third protrusion located on the wall opposite to the wall that the first protrusion is located on, the first, second and third protrusions being adapted to be detachably engaged by the cover plate.

3. The wiring device of claim 2, wherein the top surface is rectangular and the first protrusion is located on a first side wall and said second protrusion is located on a second side wall which is opposite the first side wall.

4. The wiring device of claim 3, wherein the protrusion on each side wall has a cross section which is a trapezium.

5. The wiring device as in claim 1, wherein said first protrusion and said second protrusion are configured to allow the cover plate to connect to the wiring device at either a first depth on the wiring device, or a second depth on the wiring device.

6. A method of assembling a cover plate having an aperture to a wiring device comprising the steps of:
   aligning the aperture in the cover plate with the wiring device;
   pushing the cover plate having protrusions disposed on at least two different inside faces, on to the wiring device such that the cover plate snaps onto the wiring device thereby allowing said protrusions of the cover plate to snap over protrusions formed integral with an outside face of the housing of the wiring device to lock the cover plate to the wiring device.

7. The method according to claim 6, further comprising the step of positioning a strap around an exterior portion of a frame on the wiring device.

8. The method as in claim 6, further comprising the step of:
   pushing the cover plate to a second position on said wiring device such that said wiring device has a first set of protrusions and a second set of protrusions, wherein the cover plate is positioned behind said second set of protrusions positioned at a depth position deeper than said first set of protrusions.

9. A wiring device comprising:
   a housing having a top surface, a top wall, a bottom wall and two side walls, the top surface being accessible to a user, and
   a first protrusion located on an outside surface of one of the walls and formed integral with the housing, and a second protrusion located on an outside surface of said wall, adjacent to said first protrusion but at a different depth relative to said first protrusion; and
   a wall plate configured to be coupled to at least two of said walls of said housing.

10. The wiring device as in claim 9, wherein said first protrusion is located on a first wall and said second protrusion is located on a second wall of said housing.

11. The wiring device as in claim 10, wherein said first protrusion is located on a first wall of said two side walls and said second protrusion is located on an opposite wall of said two side walls.

12. The wiring device as in claim 9, wherein said first protrusion is located along at a first length position on said first wall, and said second protrusion is located offset at a second length position on said first wall.

13. A method of assembling a cover plate having an aperture to a wiring device comprising the steps of:
   aligning the aperture in the cover plate with the wiring device, said cover plate comprising a wall plate;
   pushing the cover plate on to the wiring device, said cover plate having a first set of protrusions disposed on at least two different inside faces, such that the cover plate is coupled to the wiring device thereby allowing said protrusions of the cover plate to move past said first set of protrusions formed integral with an outside face of the housing of the wiring device to lock the wall plate to the wiring device.

14. The method as in claim 13, further comprising the step of:
   pushing the cover plate to a second position on said wiring device such that the cover plate is positioned behind at least one second set of protrusions positioned at a depth position deeper than said first set of protrusions.

* * * * *